0
United States Patent Office 2,762,782
Patented Sept. 11, 1956

2,762,782

REFORMING CATALYST BASE

Charles N. Kimberlin, Jr., and Elroy M. Gladrow, Baton Rouge, La., assignors to Esso Research and Engineering Company, a corporation of Delaware No Drawing. Application December 17, 1952,
Serial No. 326,596

4 Claims. (Cl. 252—463)

The present invention relates to improvements in the manufacture of hydroforming catalysts. More particularly, the present invention relates to improvements in the base which is normally alumina forming a part of the complete catalyst which consists of the base impregnated with hydrogenation catalysts, such as a group VI metal oxide or a platinum group metal.

Hydroforming is an operation conducted at elevated temperatures and pressures in the presence of a suitable catalyst and added hydrogen, the feed to the hydroforming operation being a virgin naphtha containing substantial amounts of naphthenes. The main reaction involved is the dehydrogenation of naphthenes to form the corresponding aromatic. However, some isomerization and aromatization and some cracking of paraffins also occurs. It is, of course, desirable to restrict the amount of cracking which occurs because cracking involves the formation of carbonaceous material and normal gaseous material, and as a result a serious loss in yield takes place unless the cracking is restricted.

It has been found that the alumina base of the conventional cracking catalyst tends to induce cracking of the paraffins and also to produce high coke yields if the diameters of its pores are small. The present invention provides means for preparing the alumina base so as to provide a product of satisfactory surface area, but in particular of increased pore diameter so that when it is combined with the dehydrogenation catalyst it may be used in the hydroforming process without causing excessive cracking or coke formation.

From the foregoing, it is indicated that the physical properties of an alumina preparation are largely dependent upon the procedure used in making the material. Important physical properties of an alumina to consider prior to its impregnation with various hydrogenation catalysts in making a reforming catalyst include the following: (1) surface area, (2) pore volume, (3) nitrogen absorption isotherm, (4) attrition loss rate when the catalyst is utilized in the hydroforming operation in the form of a dense fluidized bed. In preparing an alumina suitable as a hydroforming catalyst base, that is one having the satisfactory physical properties outlined above, proper consideration must be given to the choice of starting materials and the procedural steps carried out in its manufacture.

It has long been recognized that high surface area and a large pore volume are highly desirable properties of a hydroforming catalyst. However, it follows directly that if the material has a very high surface area and a large pore volume the density decreases and the material is fragile, and when used in the form of a fluidized bed in a hydroforming process it undergoes fragmentation to form fines which cannot be well fluidized. Therefore, in making an alumina base which is satisfactory for use in the form of a fluidized bed in the hydroforming process, in the interest of high resistance to attrition and/or fragmentation some sacrifices in desirable surface area and pore volume must be made. An alumina having definitely larger surface area and pore volume and a distinctly lower attrition rate loss than aluminas presently in use as base for commercial reforming catalyst represents a superior material.

A comparison of existing hydroforming data show that catalyst pore size distribution is an important factor in the selectivity exhibited by the resulting catalyst in a hydroforming process using a hydrocarbon feed, such as a virgin naphtha containing 35–40% of naphthenes. The data obtained with catalysts having different pore size distributions indicate that enhanced cracking and coke formation reactions occur preferentially in small pores of the catalyst base, namely in pores having a diameter of about 40 A. units or less, and therefore it is advantageous to keep the proportion of small pores in the reforming catalyst to a minimum value.

The present invention provides a technique for preparing an alumina having a relatively high surface area and pore volume, high resistance to fragmentation when employed in the form of a fluidized bed, and a very small proportion of pores, if any, having diameters less than 60 A. units.

The main object of the present invention therefore is to prepare hydroforming catalysts which possess high activity and selectivity, low cracking propensities and high resistance to fragmentation. A more specific object of the present invention is to prepare an alumina base for a hydroforming or hydrogenation catalyst which has a relatively high surface area, and pore volume, but at the same time has a very small proportion of pores having diameters small enough to induce the formation of excessive amounts of cracked gases and coke.

Other and further objects of the invention will be apparent from the following more detailed description and claims.

Aluminas suitable for the production of highly active and selective hydroforming catalysts have been obtained by the hydrolysis of aluminum alcoholates by water. However, such aluminas have generally been unsatisfactory in their resistance to attrition of fragmentation. We have now found that treating the anhydrous aluminum alcoholate with carbon dioxide prior to hydrolysis with water results in an alumina having a much improved resistance to attrition or fragmentation. The treatment with carbon dioxide does not have any adverse effect upon the alumina produced. The treatment with carbon dioxide may be accomplished by passing gaseous carbon dioxide through the anhydrous solution of aluminum alcoholate, by adding solid carbon dioxide (Dry Ice) to the anhydrous solution of aluminum alcoholate, or by treating the anhydrous solution of aluminum alcoholate with carbon dioxide in a closed system under pressure. The temperature of treatment is not critical and may be in the range of about 50° to 150° F. After the treatment with carbon dioxide the aluminum alcoholate is preferably hydrolyzed with water. The temperature of the hydrolysis is not critical and may be in the range of about 50° to 200° F. If desired, carbon dioxide may also be added to the water used for hydrolysis.

In order to set forth the invention more fully and to provide a disclosure of the preferred embodiments thereof, there is set forth below several specific examples giving full details as to the manner in which the new catalyst may be prepared. It is to be understood that the details appearing in these specific examples are illustrative and do not impose any restriction on the invention.

EXAMPLE I

Aluminum alcoholate is prepared in the conventional manner by reacting aluminum metal with a high boiling, partially water miscible alcohol such as amyl alcohol, using mercuric chloride as a catalyst. Alcohols having fewer or more carbon atoms may be employed but it is preferred that $C_5$ alcohols are used. The aluminum alcoholate thus formed is hydrolyzed by addition to an aqueous carbonic acid solution. Care should be exercised so that the pH of the aqueous phase does not rise above about pH 5.0. The hydrous alumina formed during the hydrolysis should be restricted to amounts less than 125 grams per liter of hydrolyzing water. The presence of the carbonic acid is necessary only during the hydrolysis when the hydrous alumina is being formed. While room temperatures are nominally employed, other temperatures may be used provided sufficient carbon dioxide is dissolved in the water to produce a pH less than about 5.5. pH values of 4.0 to 5.5 are satisfactory.

In order to test the hydroforming catalysts prepared from the improved alumina bases of the present invention, two catalysts were prepared, each containing 10% $MoO_3$ based on the total weight of the catalyst and tested for activity in the manner indicated below. "Catalyst A" contains an alumina base prepared according to the present invention while "Catalyst B" contains a conventional alumina base.

*Hydroforming tests in fixed bed units*

[Virgin 200–330° F. naptha; 1 v./v./hr.; 200 p. s. i. g.; 1,500 C. F./B. H.₂]

| Mode of Hydrolysis | Catalyst A, $H_2CO_3$ Solution | Catalyst B, Water alone |
|---|---|---|
| $C_6$+Yield, Vol. percent | 69.4 | 65.1 |
| Aniline Pt., °F | 14 | 0 |
| Carbon, wt. percent | 0.6 | 0.8 |
| Dry Gas, wt. percent | 13.0 | 16.1 |

It will be noted that catalyst A gives a higher yield of liquid product than does catalyst B, and at the same time less carbon and dry gas are formed when catalyst A is used than when catalyst B is used.

EXAMPLE II

Fifty-four pounds of aluminum metal in the form of turnings are dissolved in about 123 gallons of a 50/50 mixture of mixed amyl alcohols and petroleum naphtha boiling in the rangs of 200 to 300° F. About 1/10 ounce of mercuric chloride is used as a catalyst for the reaction between aluminum and the amyl alcohol. It is necessary to heat the mixture to start the reaction between the metal and the alcohol, but after the reaction is started cooling is required. The resulting anhydrous solution of aluminum amylate in excess amyl alcohol and petroleum naphtha is hydrolyzed by mixing with about 190 gallons of water at about 80° F. The mixture is allowed to settle into a lower aqueous layer comprising a slurry of hydrous alumina and an upper layer of petroleum naphtha and regenerated amyl alcohol. The upper layer is decanted and dried for reuse. The lower aqueous layer of hydrous alumina slurry is dried in an oven at about 250° F., and the resulting alumina gel is activated by heating 6 hours at about 1200° F. This alumina is designated as #1.

EXAMPLE III

Fifty-four pounds of aluminum metal are dissolved in 123 gallons of mixed amyl alcohols and petroleum naphtha as described in Example II. The anhydrous solution of aluminum amylate in petroleum naphtha and excess amyl alcohol is saturated with anhydrous carbon dioxide at atmospheric pressure and about 80° F. by bubbling a stream of carbon dioxide gas through the liquid at a rate of about 200 cubic feet per hour for about one-half hour. The treated alcoholate is immediately hydrolyzed by mixing with about 190 gallons of water at about 80° F. The mixture is allowed to settle and the lower aqueous layer of hydrous alumina slurry is dried in an oven at about 250° F. and the resulting alumina is activated by heating 6 hours at about 1200° F. This alumina is designated as #2.

An examination of the physical properties of the alumina prepared according to the procedure set forth in the following examples shows that the present method gives superior results as set forth in the below tabulation.

| Alumina | #1 | #2 | A[1] | B[1] | C[1] |
|---|---|---|---|---|---|
| Surface Area, $M^2/g$ | 180 | 170 | 105 | 107 | 85 |
| Pore Volume, cc./g | 0.49 | 0.50 | 0.39 | 0.29 | 0.28 |
| Avg. Pore Diam., A | 109 | 118 | 122 | 108 | 132 |
| Attrition Rate, Percent/Hour | 6.4 | 2.2 | 4.6 | 8.1 | 5.3 |

[1] A, B, and C are commercial aluminas.

The attrition rate is a measure of the tendency of the particles of a fluidized catalyst to disintegrate into smaller particles in use. A low attrition rate is desirable for a catalyst for use in a fluidized system. The apparatus for measuring the attrition rate comprises essentially a settling chamber consisting of a vertical cylinder with conical ends, opening at the top into a dust collecting filter, and having a 0.07 inch diameter jet mounted at the bottom for the introduction of air. The cylindrical section has a diameter of 9 inches and a height of 6¾ inches; the upper conical section has a length of 6¾ inches; the lower conical section has a length of 16¾ inches. A 15-gram sample of the fluidizable catalyst to be tested is placed in the apparatus and subjected to a jet of air using a flow rate of 21 liters of air per minute for 5 hours. The fines produced are collected in the dust collecting filter and weighed at hourly intervals. The attrition rate is the average hourly rate of fines collection during hours 2 to 5 expressed as weight percent of the original catalyst sample.

Aluminas #1 and #2 are individually converted into hydroforming catalysts comprising about 10% molybdena by impregnation with ammonium molybdate solution using about 1.35 pounds of ammonium molybdate dissolved in 3 quarts of water for each 10 pounds of alumina. After impregnation the catalysts are re-dried and activated by heating 6 hours at 1200° F. These catalysts are used in the form of 3/16-inch by 3/16-inch cylindrical pellets in a fixed bed operation for the hydroforming of a 200° F. to 330° F. boiling range virgin naphtha from mixed Southeast and West Texas crudes. The condtions employed are 900° F. temperature, 200 pounds per square inch pressure using 1,500 cubic feet of added hydrogen per barrel of naphtha feed and a feed rate of one volume of naphtha per volume of catalyst per hour. The following results are obtained.

| Alumina Base | #1 | #2 |
|---|---|---|
| $CO_2$ Treated | No | Yes |
| Aniline Point of $C_6$+Product, °F | 0 | 0 |
| Yield of $C_6$+Product, Vol. Percent | 65.1 | 65.3 |

The above data show that the carbon dioxide treatment has not had any adverse effect upon the catalytic properties of the product, while greatly improving the attrition resistance.

To recapitulate briefly, the present invention contemplates preparing a hydroforming catalyst comprising an alumina base prepared by the so-called alcoholate method modified by the feature of treating the alcoholate in a substantially anhydrous medium with carbon dioxide to yield a form of alumina which, when combined with a hydroforming catalyst, possesses good attrition resistance when employed in the form of a fluidized bed in a hydroforming operation. The said alumina after activation for 6 hours at 1200° F. has a surface area of from 100 to 250 square meters per gram, a pore volume of from 0.25 to 0.55 cc. per gram, and an average pore diameter of from 60 to 150 A. This base, when combined with a hydroforming catalyst and utilized in the form of a fluidized bed of the powdered catalyst, possesses an attrition resistance such that less than about 3.0 weight per cent per hour of the catalyst disintegrates physically into fines, i. e., material having a particle size below 20 microns when subjected to a standard attrition rate test as hereinbefore described. The catalyst prepared according to the present method possesses good activity as shown by the foregoing data.

In the foregoing specific examples, it will be noted that the drying of the alumina slurry was carried out at a temperature of 250° F. Obviously, this drying may be carried out at temperatures above and below this temperature, as for example, within the range of from about 220 to 500° F. And with respect to the reactivation of the catalyst which is given in the examples as being carried out at 1200° F. for 6 hours, it is pointed out that this activation can be carried out at temperatures of from 900 to 1400° F. during a period of 1 to 12 hours with satisfactory results. However the activation may be omitted if desired.

In the preparation of the alcoholate, it is pointed out that while a water soluble alcohol may be used to react with the metallic aluminum, it is preferred to employ a higher alcohol, namely, one containing from 5–7 carbon atoms.

Numerous modifications of the present invention may be made by those familiar with this art without departing from the spirit thereof.

What is claimed is:

1. The method of forming an alumina catalyst support possessing high mechanical strength, surface area, pore volume, and average pore diameter which comprises reacting metallic aluminum with an alcohol in the presence of a catalyst to form the corresponding aluminum alcoholate in a medium which is substantially anhydrous, thereafter saturating the said medium with carbon dioxide by passing a stream of carbon dioxide gas therethrough, thereafter adding water to effect hydrolysis of the aluminum alcoholate to form a hydrous alumina slurry, separating the slurry from the liquid medium, drying the said slurry and heating the dried alumina for an extended period of time at temperatures sufficiently elevated to effect activation thereof.

2. The method set forth in claim 1 in which the alcohol employed is only partially miscible with water.

3. The method set forth in claim 1 in which the alcohol employed is amyl alcohol.

4. An alumina catalyst support prepared in accordance with the method of claim 1 which has a pore volume of from about 0.25 to 0.55 cubic centimeters per gram.

References Cited in the file of this patent

UNITED STATES PATENTS 2,636,865     Kimberlin _____ Apr. 28, 1953